(12) United States Patent
Bello et al.

(10) Patent No.: US 9,021,510 B2
(45) Date of Patent: *Apr. 28, 2015

(54) REMOTE PROCEDURE CALL (RPC) BIND SERVICE WITH PHYSICAL INTERFACE QUERY AND SELECTION

(75) Inventors: Adekunle Bello, Pflugerville, TX (US);
Andrew Dunshea, Austin, TX (US);
Nikhil Hegde, Round Rock, TX (US);
Paul H. Hernandez, Austin, TX (US);
Aruna Yedavilli, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 79 days.

This patent is subject to a terminal disclaimer.

(21) Appl. No.: 13/584,359

(22) Filed: Aug. 13, 2012

(65) Prior Publication Data

US 2012/0324483 A1 Dec. 20, 2012

Related U.S. Application Data

(63) Continuation of application No. 12/631,016, filed on Dec. 4, 2009, now Pat. No. 8,266,639.

(51) Int. Cl.
*G06F 15/173* (2006.01)
*G06F 9/54* (2006.01)

(52) U.S. Cl.
CPC ..................................... *G06F 9/547* (2013.01)

(58) Field of Classification Search
CPC ..... H04L 43/0811; H04L 12/66; H04L 45/00;
H04L 67/42; H04L 45/12; H04L 45/123;
H04L 45/74; H04L 41/22; H04L 61/2007;
H04L 67/40; H04L 63/0236; G06F 13/14;
G06F 9/4416; G06F 9/45512; G06F 9/547;
G06F 9/548; G06F 11/0748; H04W 40/246;
H04W 40/30

See application file for complete search history.

(56) References Cited

U.S. PATENT DOCUMENTS

| 5,452,459 A | 9/1995 | Drury et al. |
| 5,491,800 A | 2/1996 | Goldsmith et al. |
| 5,511,197 A | 4/1996 | Hill et al. |

(Continued)

OTHER PUBLICATIONS

Glesner, et al., "Reconfigurable Platforms for Ubiquitous Computing", ACM International Conference on Computing Frontiers, Apr. 2004, pp. 377-389, Ischia IT.

(Continued)

*Primary Examiner* — Tuan Dao
(74) *Attorney, Agent, or Firm* — Mitch Harris, Atty at Law, LLC; Andrew M. Harris; Parashos T. Kalaitzis

(57) ABSTRACT

A service module that provides for discovery of one or more network interfaces connecting a prospective remote procedure call (RPC) client, facilitates the provision of RPC programs in a network including multi-horned systems. When a request for a network address to an RPC application providing an RPC program is received from the RPC client, the RPC bind daemon discovers from the module, using the client response address, over which interface(s) the client is accessible. The daemon then selects an address of a network path to the RPC application that the prospective client can access and returns the corresponding network address. The service module monitors the network stack for RPC get address requests and builds tables of client address entries with corresponding network interface identifiers. The entries are retired according to an aging policy.

21 Claims, 5 Drawing Sheets

(56) References Cited

U.S. PATENT DOCUMENTS

| | | |
|---|---|---|
| 5,548,723 A | 8/1996 | Pettus |
| 5,761,507 A | 6/1998 | Govett |
| 6,101,188 A | 8/2000 | Sekine et al. |
| 6,295,276 B1 | 9/2001 | Datta et al. |
| 6,321,275 B1 | 11/2001 | McQuistan et al. |
| 6,728,788 B1 * | 4/2004 | Ainsworth et al. ........... 719/330 |
| 6,901,072 B1 | 5/2005 | Wong |
| 7,075,895 B1 | 7/2006 | Hanam |
| 7,145,866 B1 | 12/2006 | Ting et al. |
| 7,779,086 B1 | 8/2010 | Gammo et al. |
| 7,853,962 B1 | 12/2010 | Romano et al. |
| 7,913,262 B2 | 3/2011 | Brabson et al. |
| 7,933,272 B2 * | 4/2011 | Morris ........................... 370/392 |
| 2003/0140124 A1 | 7/2003 | Burns |
| 2004/0154028 A1 * | 8/2004 | Wang et al. .................. 719/330 |
| 2005/0071507 A1 * | 3/2005 | Ferlitsch ...................... 709/245 |
| 2005/0152355 A1 | 7/2005 | Henriques |
| 2006/0045098 A1 | 3/2006 | Krause |
| 2006/0268863 A1 | 11/2006 | Chang et al. |
| 2006/0274752 A1 | 12/2006 | Jain et al. |
| 2007/0283367 A1 * | 12/2007 | Brabson et al. ............... 719/330 |
| 2008/0025230 A1 * | 1/2008 | Patel et al. .................... 370/252 |
| 2008/0059654 A1 * | 3/2008 | Linderman .................... 709/246 |
| 2010/0150155 A1 * | 6/2010 | Napierala ..................... 370/390 |

OTHER PUBLICATIONS

Park, et al., "Information Systems Interoperability: What Lies Beneath?", ACM Transactions on Information Systems, vol. 22, No. 4, Oct. 2004, pp. 595-632, New York, US.

Hsueh, et al., "Boosting Ethernet Using Regular Switching Hubs," Journal of Information Science and Engineering vol. 22 pp. 721-734, 2006.

Lin, et al., BondingPlus: Real-Time Message Channel in Linux Ethernet Environment Using Regular Switching Hub, Real Time Computing Systems and Applications Conference, Taipei, TW, Feb. 18-20, 2003.

Jiang, et al., "VIOLIN: Virtual Internetworking on Overlay Infrastructure", CS Technical Report CSD TR 03-027, Purdue University, Jul. 2003.

Parr, "Address Resolution for an Intelligent Filtering Bridge Running on a Subnetted Ethernet System," ACM SIGCOMM Computer Communication Review, vol. 17, No. 3, pp. 48-70, Jul./Aug. 1987, US.

* cited by examiner

REMOTE PROCEDURE CALL (RPC) BIND SERVICE WITH PHYSICAL INTERFACE QUERY AND SELECTION

The present U.S. Patent Application is a Continuation of U.S. patent application Ser. No. 12/631,016 filed on Dec. 4, 2009, published as U.S. Publication 20110138404 on Jun. 9, 2011 and issued as U.S. Pat. No. 8,266,639 on Sep. 11, 2012. The disclosure of the above-referenced U.S. Patent Application is incorporated herein by reference.

BACKGROUND OF THE INVENTION

1. Field of the Invention

The present invention is related to networking computer systems, and more specifically to a method and system for implementing remote procedure call (RPC) programs in a manner that ensures their accessibility.

2. Description of Related Art

In networked computer systems, and in particular, in systems that include multiple network interfaces per processing node, there are typically multiple sub-nets and in larger networks, multiple domains. Each sub-net or domain will typically include many computer systems, each of which is executing an operating system that may provide RPC programs to client applications both within the same computer system, and to remote RPC clients that are connected to the computer system through a network path. The daemon that manages RPC connections is named rpcbind.

An RPC application registers one or more RPC programs that it supports by calling an interface on rpcbind daemon: rpcb_reg( ). The rpcb_reg( ) call provides an RPC program number, and a successful call registers the program provider as the provider of that program. Subsequent rpcb_getaddr( ) calls to the rpcbind daemon by prospective clients provide a program number, which the rpcbind daemon satisfies by returning a universal network address associated with the RPC application that supports the RPC program that was requested.

However, in the multi-horned system described above, a prospective RPC client cannot necessarily use the address for an RPC application that the RPC bind daemon may return. For example, if an RPC application that serves a particular RPC program is on a first sub-net of the network and the prospective client is on a second sub-net, the address returned by the RPC bind daemon for the RPC application in the first sub-net may not have a routing path from the second sub-net. Further, even if such a path is present, there may be a firewall or filtering present, or the route may be very inefficient. The particular location of a prospective RPC client is typically not known, since the request may have originated anywhere in the network and from any network adapter connected to the operating system hosting the rpcbind daemon reached by the request. Further, when complex network connections are involved, a request could prospectively reach multiple rpcbind daemon instances and/or an rpcbind instance could potentially be aware of multiple applications that service a program number, configurations that are either avoided, or in the case of multiple applications servicing a program number, typically rejected by the rpcbind daemon. While alternate rpcbind daemons and/or multiple RPC applications servicing a program number could provide improved connectivity to RPC programs, the structure of the RPC mechanism typically prohibits such arrangements.

Therefore, it would be desirable to provide a rpcbind daemon that can provide accessible RPC program addresses in a network including multi-horned computer systems. It would further be desirable to provide RPC functionality for a given program number from multiple applications and to provide multiple distributed rpcbind daemons within a network.

BRIEF SUMMARY OF THE INVENTION

The invention is embodied in a computer-performed method, computer program product and computer system that respond to RPC program address requests in a manner that ensures accessibility to the application providing the RPC program by a requesting client. The computer system is a system that carries out the steps of the method and the computer program product is a computer-readable storage medium containing program instructions for carrying out the steps of the method.

The method receives a request for the address of an RPC program from a prospective RPC client. A network path to a RPC application providing the program is selected and the corresponding universal address returned, by determining through which of multiple network interfaces the prospective client can access an RPC application, which may effectively select an RPC application, accordingly. If multiple network paths to an RPC application providing the program number are accessible to the prospective client (and optionally multiple RPC applications), then a heuristic can be applied to select the network path to the RPC application, such as a network path to the prospective client that is not firewalled, has the least number of links, has a lowest cost, is set as "preferred" by the system, and so forth.

The routing path to the prospective client can be discovered using a module that monitors the network stack for rpcb_getaddr( ) requests and builds a table of entries relating the requestors to the particular network interface from which the rpcb_getaddr( ) requests arrived. The entries are discarded according to an aging criteria to maintain proper dynamics of the network. When an RPC program request arrives, the rpcbind daemon can query the module to obtain an interface identifier. The interface identifier is then used to select the proper network path to use to connect an RPC application to the prospective client.

The foregoing and other objectives, features, and advantages of the invention will be apparent from the following, more particular, description of the preferred embodiment of the invention, as illustrated in the accompanying drawings.

BRIEF DESCRIPTION OF THE SEVERAL VIEWS OF THE DRAWING

The novel features believed characteristic of the invention are set forth in the appended claims. The invention itself, however, as well as a preferred mode of use, further objectives, and advantages thereof, will best be understood by reference to the following detailed description of the invention when read in conjunction with the accompanying Figures, wherein like reference numerals indicate like components, and:

DETAILED DESCRIPTION OF THE INVENTION

The present invention relates to remote procedure call (RPC) services, and specifically with techniques to ensure that an RPC client receives an accessible universal address for an RPC application or program, in particular in multi-horned systems where a client may exist on a different sub-net than some of the RPC servers within the system. Upon receiving an rpcb_getaddr( ) request that connects a prospective RPC client to a program interface, the rpcbind daemon determines through which network interface(s) the RPC client can access the system and selects a network path over which the prospective RPC client can access the RPC application, e.g. by selecting a universal network address to return to the prospective RPC client. If multiple network paths to the RPC application are accessible by the prospective RPC client, a heuristic may be used to select from among the multiple network paths, such as least-cost, minimum links, not firewalled, system preferred, or other criteria that indicates a particular network interface and/or network path is preferred over another. The techniques of the present invention can also be used to select from among multiple RPC applications that service a given program number, since the universal address/network path returned by the rpcbind daemon of the present invention also uniquely specifies the RPC application. Further, multiple rpcbind daemons could potentially exist in a network without creating a conflict, since an rpcbind daemon that is reachable by a prospective client should then be able to identify which network interface to use in selecting an RPC application to provide the requested RPC program.

A service module provides physical network interface identification in response to receiving a request from the rpcbind daemon. The module may provide a system application programming interface (API) or may be an RPC application that provides a program that returns the network interface identifier given the prospective client's response address as input. The module monitors network traffic for rpcb_getaddr( ) requests, generally by insertion as part of the network stack. When an rpcb_getaddr( ) request is detected, the corresponding requestor address is inserted in a table as an entry that also includes the network interface identifier. The entries are retired according to an aging function to match the dynamic nature of the network. When an rpcb_getaddr( ) request is received by the rpcbind daemon, the rpcbind daemon queries the service module to return the network interface identifier for the provided prospective client's response address. When the request to map the prospective client's response address to a network interface is received by the module, the module returns the interface identifier from an entry in the table that corresponds to the client's response address.

Figure 1:
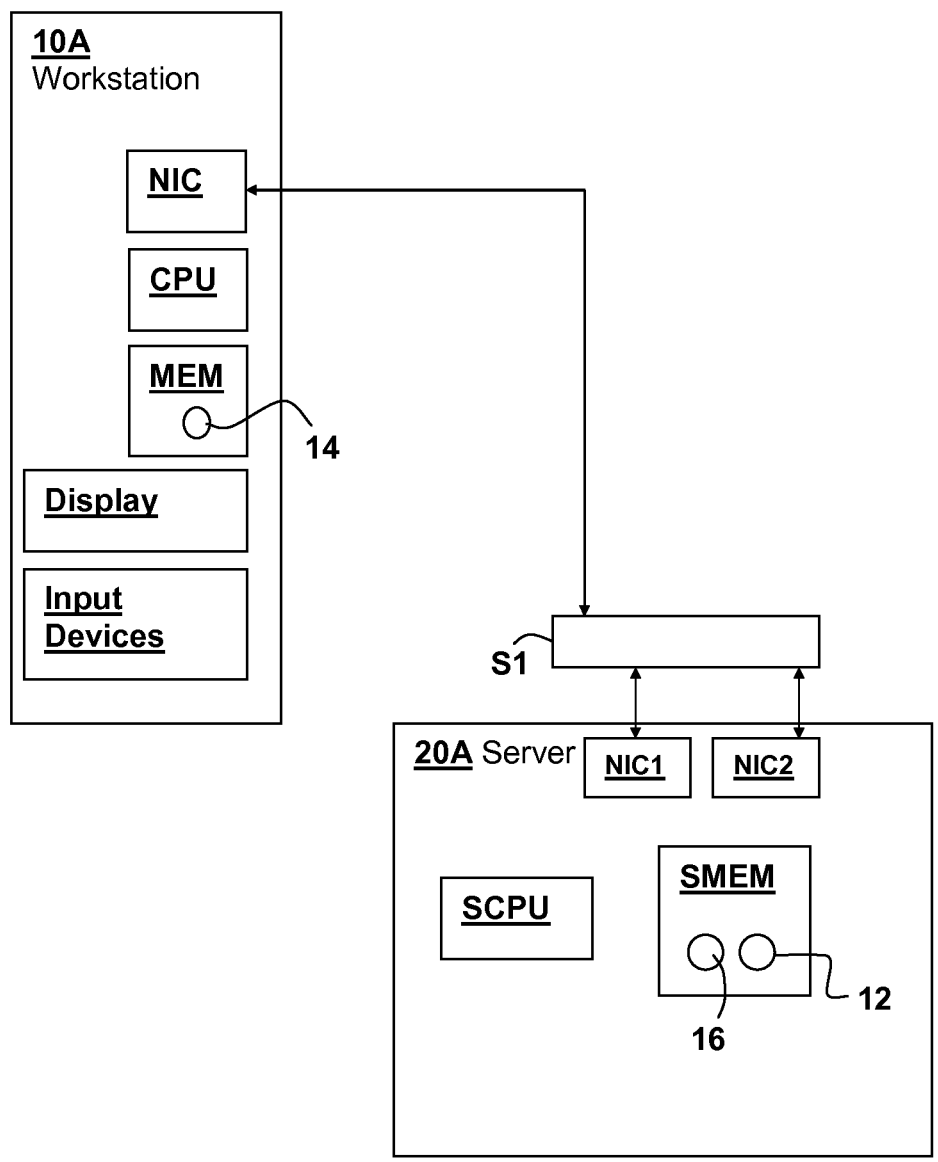
FIG. 1 is a block diagram illustrating a networked computer system in which techniques according to an embodiment of the present invention are practiced.

Referring now to FIG. 1, a networked computer system in which an embodiment of the present invention is practiced is depicted in a block diagram. A server 20A includes a server processor SCPU coupled to a server memory SMEM that contains program instructions for implementing a portion of a system in accordance with an embodiment of the present invention and forming a computer-program product in accordance with another embodiment of the present invention. Server 20A also includes multiple network interfaces NIC1 and NIC2 that connect server 20A to a network. In particular, server memory SMEM includes an rpcbind daemon 12 that provides RPC binding functionality in accordance with an embodiment of the present invention. Server memory SMEM also includes an RPC application 16 to which rpcbind daemon 12 binds program requests (rpcb_getaddr( ) requests) received from the network. Server 20A is coupled by the network to a workstation computer 10A through a network interface NIC of workstation computer 10A, which in the depicted embodiment includes a workstation processor CPU coupled to a workstation memory MEM, as well as a display Display and input devices Input Devices, such as a mouse and keyboard, that provide user interfaces for interacting with applications within the depicted computer system, as well as configuring at least one operating system that provides RPC services in accordance with an embodiment of the present invention. The network connecting workstation computer 10A to server 20A may include wireless local area networks (WLANs), wired local-area networks (LANs), wide-area networks (WANs) or any other suitable wired or wireless network.

In the illustrated example, workstation memory MEM includes an application program 14 that uses RPC services and is therefore an RPC client. Application program 14 contacts rpcbind daemon 12 to obtain an address of an RPC application 16 that provides a needed RPC program number. In the present invention, the universal address provided in response to the request (a rpcb_getaddr( ) request) is selected from among multiple network paths by which the prospective RPC client (application program 14) can read RPC application 16. Exemplary processes and structures for performing the selection are set forth in further detail below. The present invention concerns RPC techniques that are not limited to a specific computer system configuration, workstation/server arrangements or requiring workstations at all, as some embodiments of the present invention are applicable to multiple server computer systems in which RPC services accessed on a first server by a second server. Finally, the specification of a server 20A and a workstation 10A and the location of their specific memories MEM and SMEM does not imply a specific client-server relationship or hierarchical organization, as the techniques of the present invention may be employed in distributed systems in which no particular machine is identified as a server, but at least one of the machines provides an RPC daemon and RPC applications for providing RPC program interfaces, and in which addresses of the RPC applications are mapped according to techniques of the present invention.

As illustrated in FIG. 1, workstation 10A is connected to server 20A by a switch S1 that is connected to network interfaces NIC1 and NIC2. In the depicted configuration, server 20A is a multi-horned server, because server 20A has multiple paths to nodes within the network, generally as specified by multiple sub-networks (sub-nets), causing the possibility of duplicate addresses that do not conflict because of the separate networks or sub-nets, but otherwise represent a problem in generating a universal address that uniquely and correctly specifies a particular node. For example, if RPC client 14 contacts rpcbind daemon 12 within server 20A with an rpc_getaddr( ) request for a program number supported by an RPC application registered with rpcbind daemon 12, then a path exists to RPC client 14 through S1 from rpcbind daemon 12. However, the existence of such a path is not a guarantee that RPC application 16 is reachable via any network path between workstation 10A and server 20A. For example, if RPC application 16 within server 20A is registered with rpcbind daemon 12 to service program number ten, but using an address that corresponds to a sub-net corresponding to network interface NIC2 then rpcbind service 12, when contacted by RPC client 14 with a rpcb_getaddr(10, . . . ) request, will return an address corresponding to an interface on RPC application 16 on the sub-net corresponding to network interface NIC2, which might not have a route to and from RPC client 14 either because there is no routing function between the sub-nets, or because the requisite port number is firewalled for the path through network interface NIC2 at some point along the corresponding network path. In particular, even if server 20A bridges the portions of the network connected by network interfaces NIC1 and NIC2, if the sub-nets assigned to the network portions do not overlap in address space, then RPC client 14 will not be able to communicate with RPC application 16 unless a correct address is returned by rpcbind server 12 that makes RPC application 16 reachable, which requires knowledge of which network interface controller NIC1, NIC2 supports the connection from RPC client 14 to rpcbind daemon 12. The present invention provides functionality for rpcbind daemon 12 to determine which network interface NIC1, NIC2, received the rpcb_getaddr( ) request so that an address of a reachable RPC application or a best-effort address can be returned, and if multiple network paths can be used, a network path with a lowest cost or best performance is selected.

Figure 2:
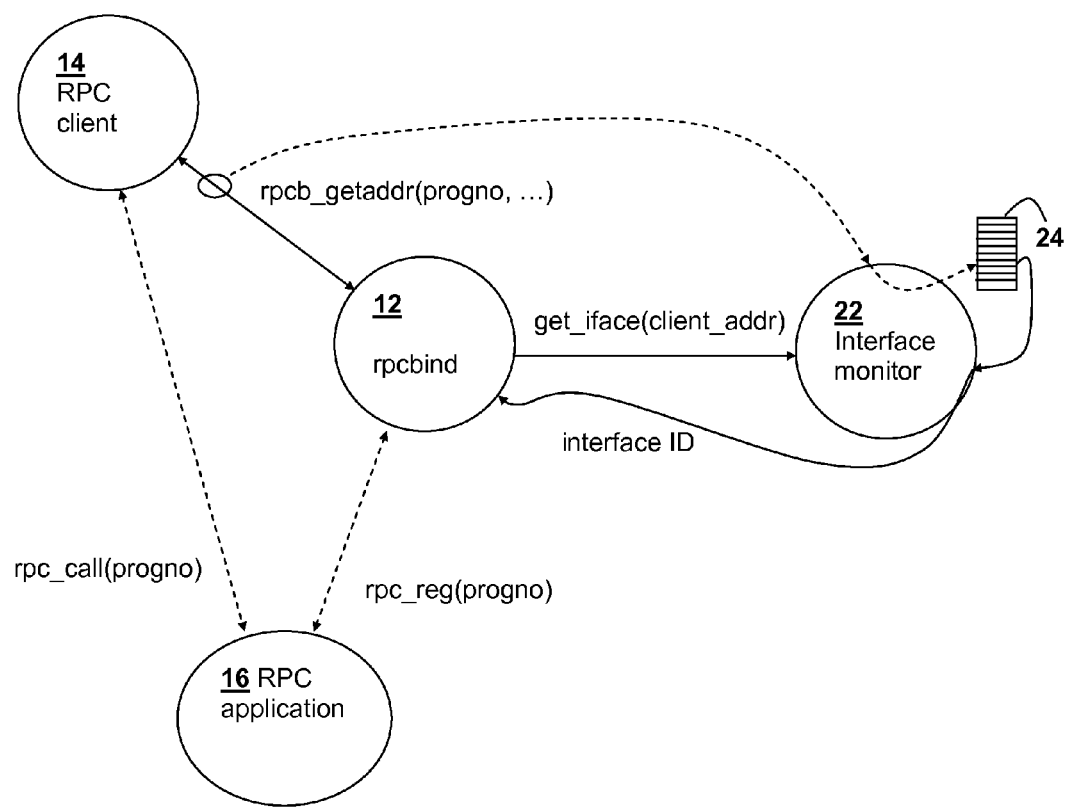
FIG. 2 is a pictorial diagram showing an exemplary relationship between program modules and their intercommunication within the system of FIG. 1.

Referring now to FIG. 2, a pictorial diagram illustrating a relationship between modules and interfaces within the system of FIG. 1 is shown. The depicted structure is only one of many possible program structures for implementing the identification methodology described herein, and is provided as an example of an embodiment of a structure in accordance with an embodiment of the present invention. A prospective RPC client, (e.g., RPC client 14), sends a rpcb_getaddr (progno, . . . ) message to rpcbind daemon 12. An interface monitor 22 monitors traffic entering server 20A from network interfaces NIC1 and NIC2, generally by implementing interface monitor 22 as part of the network stack, e.g., a TCP/IP protocol driver. When rpcb_getaddr( ) messages are received by server 20A, a table 24 is examined for an entry corresponding to the originator's address (i.e., the response address of prospective RPC client 14), and if an entry is present, the entry is updated. Table 24 contains entries that include a network address, an interface ID (e.g., an identifier uniquely identifying the network interface such as NIC1 or NIC2 from which an rpcb_getaddr( ) request arrived), and a timestamp. The timestamp is used to retire entries, since due to the dynamic nature of the network, as well as the location of RPC services, need to be removed fairly often so as to avoid connecting RPC clients to an RPC server that is no longer available. When the rpcbind daemon 12 receives the rpcb_getaddr( ) message from RPC client 14, a query is sent to interface monitor 22 including the origin address from the rpcb_getaddr( ) message. Interface monitor 22 performs a look-up in table 24 and using the interface ID present in the table (if an entry is present) maps the universal address returned to RPC client 14 in response to the rpcb_getaddr( ) message, so that a binding to an RPC application for the specified program number will have a network path that provides a desired level of connectivity. If an entry is not present in the table, rpcbind daemon 12 will generally make a best-effort to generate a universal address by using the first network adapter or locating similarly-addressed entries in table 24. If multiple network paths are supportable (i.e., multiple possible universal addresses could be returned), then a heuristic can be used to select from among the possible addresses/network paths. The criteria used may include whether a path is firewalled (with a preference to avoid firewalls), how many links are present (with a preference to reduce the number of links), whether a link has a higher system assigned cost than another (with a preference for least cost), or whether a particular physical network interface is designated as preferred. A table can be used to provide the heuristic information for the sub-net masks or specific addresses and include flags for the firewalled and preferred condition, as well as flags or numerical values for the number of links and/or cost.

Figure 3:
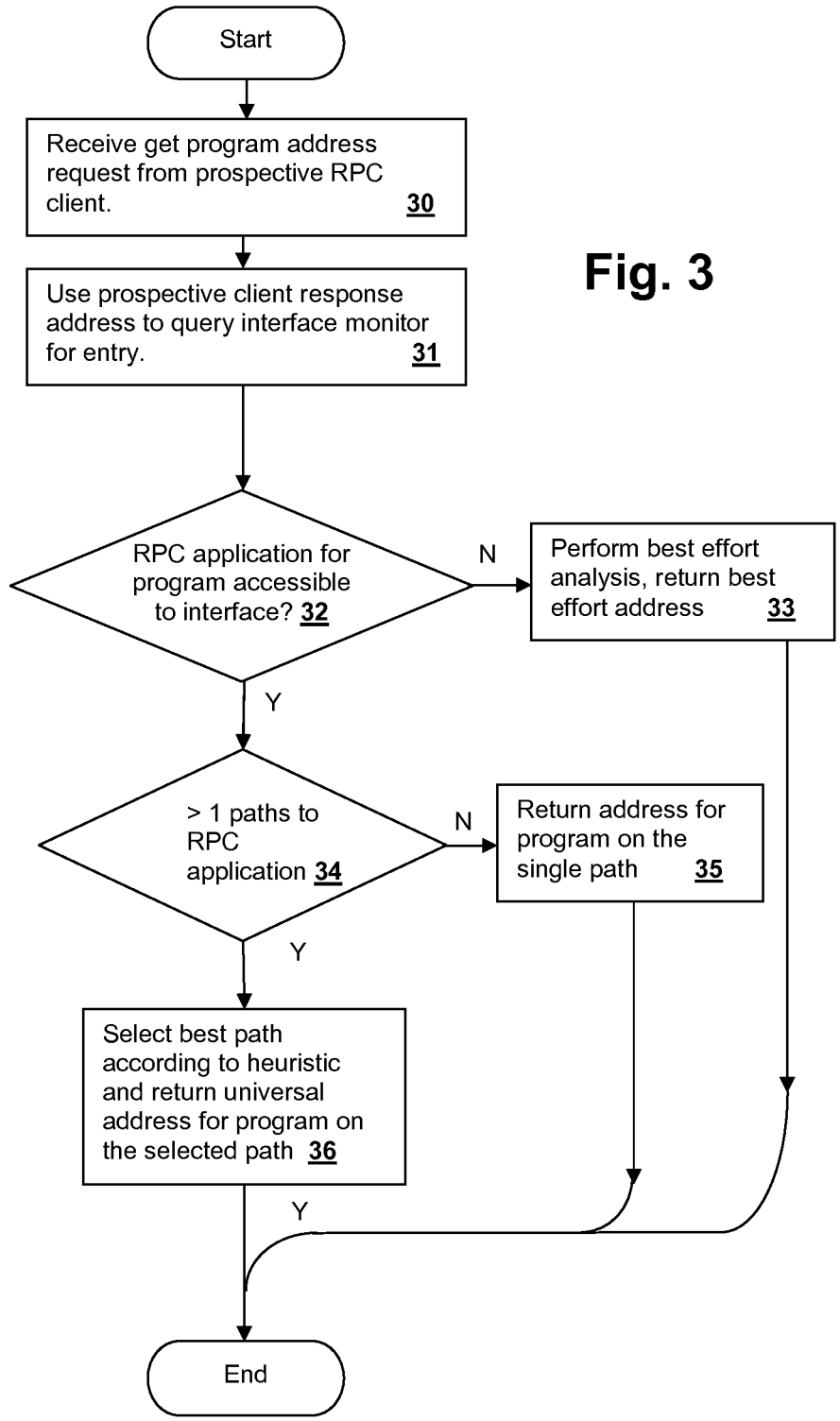
FIG. 3 is a flow chart of a method in accordance with an embodiment of the present invention.

Referring now to FIG. 3, a method in accordance with an embodiment of the present invention is depicted in a flowchart. When a get program address request is received from a prospective RPC client (step 30), the prospective client response address is used to query interface monitor 22 for an entry in table 24 (step 31). If an RPC application for the specified program number is not known to be accessible to the interface (decision 32), a best effort selection is made as described above and the best-effort address is returned (step 33). Otherwise, if there is more than one possible network path to the RPC application (decision 34), then the best path is selected according to one or more of the heuristics described above and an address of the RPC application on the selected network path is returned (step 36). Otherwise, if only a single network path provides connectivity (decision 34), then the address for the single network path is returned (step 35).

Figure 4:
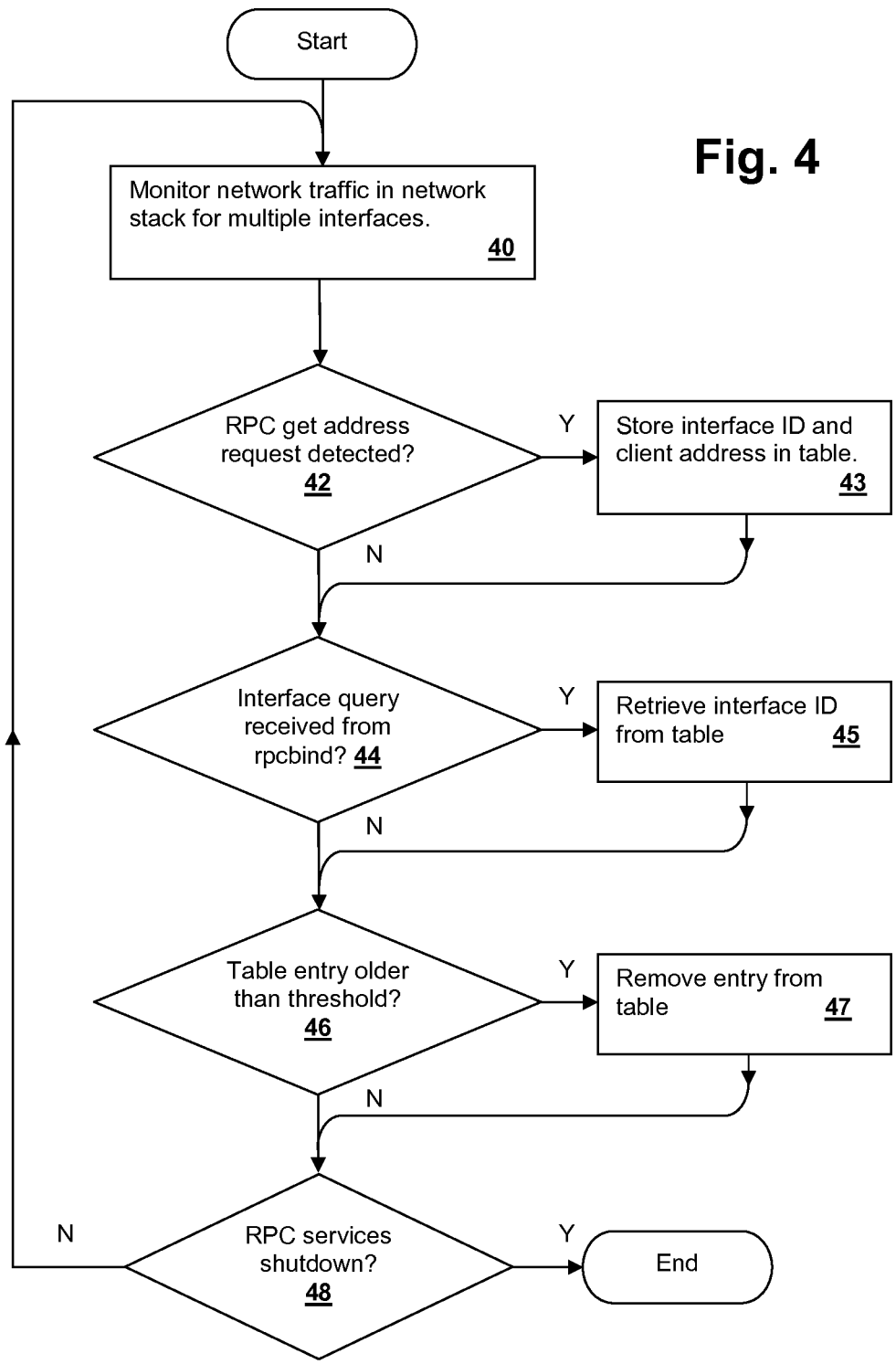
FIG. 4 is a flow chart of a method in accordance with another embodiment of the present invention.

Referring now to FIG. 4, a method in accordance with another embodiment of the present invention is illustrated in a flowchart. The depicted method describes an exemplary operation of a service module that provides the network interface lookup functionality of the present invention. The service module monitors traffic in the network stack for multiple physical network interfaces (step 40). When an RPC get address request is detected (decision 42), the physical network interface ID and the client (originator) address is stored in the table (step 43). If a query is received from the rpcbind daemon (decision 44), the service module retrieves the physical network interface ID from the table and the ID is returned to the rpcbind daemon (step 45). When a table entry is older than a threshold aging value (decision 46), then the entry is removed from the table (step 47). Until RPC services are shutdown, e.g., due to system shutdown, (decision 48), the service module continues to monitor the network stack and respond to requests from rpcdaemon according to steps 40-48.

Figure 5:
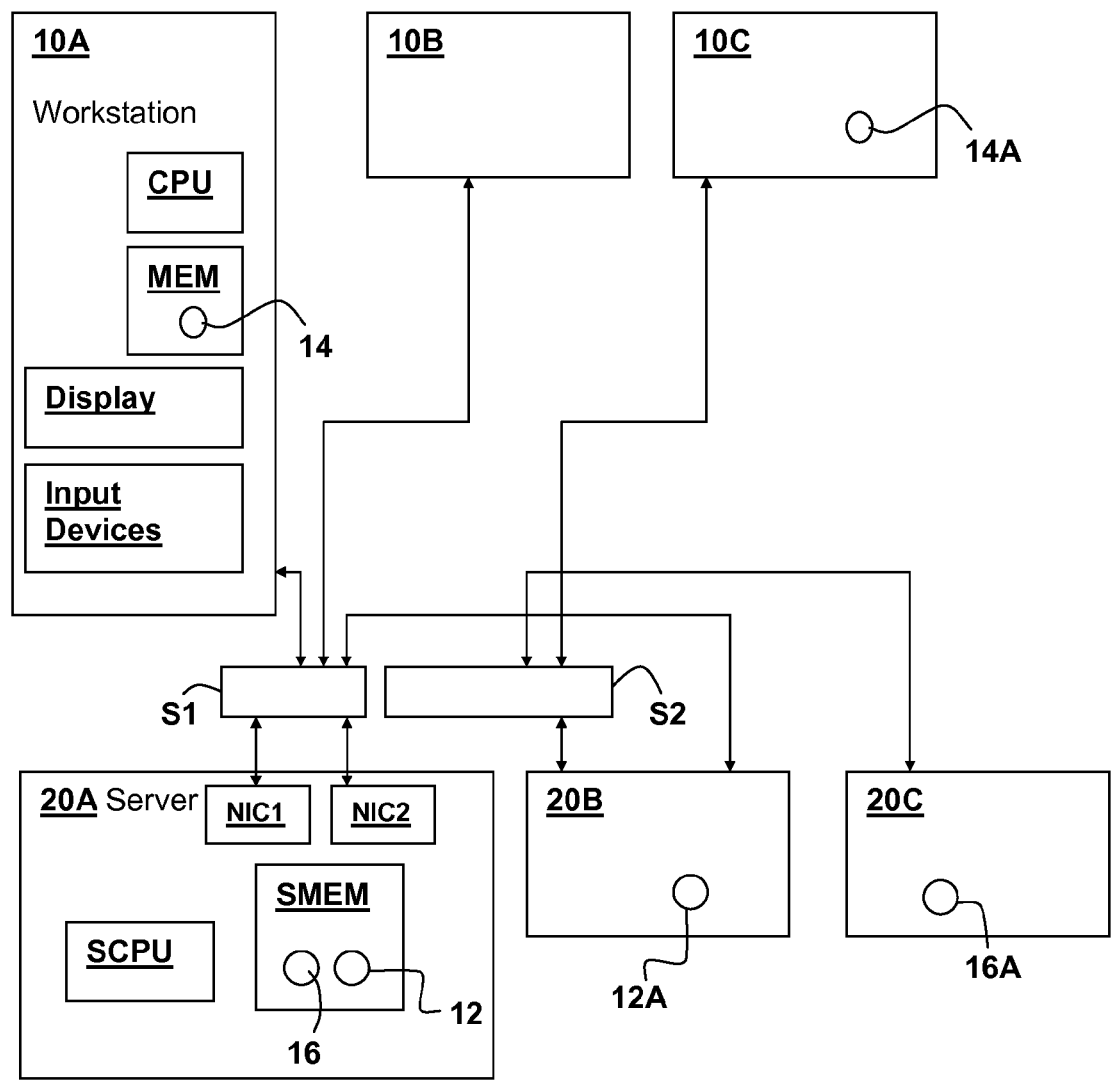
FIG. 5 is a block diagram illustrating another networked computer system in which techniques according to an embodiment of the present invention are practiced.

Referring now to FIG. 5, another networked computer system in which an embodiment of the present invention is practiced is depicted in a block diagram. Server 20A and workstation 10A are provided as described above with respect to FIG. 1. Additional workstation computers 10A-10C are also connected to the network through switches S1 and S2. As illustrated, the network connections are not symmetric and are more representative of an arbitrary network including a larger number of systems. Additional servers 20B and 20C have features similar to those of server 20A and are also included in the depicted computer system. Servers 20A-20C are coupled by the network to workstation computers 10A-10C, which can be assumed identical in form to workstation 10A.

In the illustrated example, an additional RPC application 16A is depicted as executing within server 20C, an additional rpcbind daemon 12A is depicted as executing within server 20B, and an additional RPC client 14A is illustrated as executing within workstation 10C, for generality. Since there are multiple rpcbind daemon instances 12, 12A, an rpcb_getaddr( ) request will generally be processed by the first rpcbind daemon that filters the network stack of a machine in the network path over which the rbcp_getaddr( ) request travels. So, for example, if RPC client 14 issues an rpcb_getaddr( ) request, rpcbind daemon 12 will generally respond to the request as described above with reference to FIG. 1. An address of RPC application 12 will be returned and subsequent RPC activity will be provided between RPC client 14 and RPC application 12. However, if RPC client 14A issues an rpcb_getaddr( ) request, rpcbind daemon 12A will generally receive the request and could conceivably respond with an address of either RPC application 16 on server 20A or RPC application 16A on server 20C. The service module that tracks rpcb_getaddr( ) requests may contain information about network paths to multiple RPC applications, with associated path information such as the cost/preference information described above with respect to FIGS. 1-4. Once a selection of a network path is made, i.e., a particular universal address is assigned and returned in response to the rpcb_getaddr( ) request, the selection of a particular RPC application is implicit in the address, and therefore the present invention provides further scalability in distributing RPC applications.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A computer-performed method for connecting to remote procedure call (RPC) programs in a computer system coupled to a network through multiple network interfaces, the method comprising:
   receiving a request for a network address to an RPC program from a prospective RPC client, wherein the request includes a response address of the prospective RPC client;
   identifying, from the response address, an identity of a particular one of the multiple network interfaces through which the prospective RPC client sent the request;
   in conformity with the identity of the particular network interface, determining an address of an RPC application that is accessible to the RPC client over the particular network interface and that provides the RPC program specified in the request; and
   returning the address of the RPC application to the prospective RPC client in response to the received request.

2. The computer-performed method of claim 1, wherein the prospective client is accessible to the RPC application that provides the RPC program specified in the request over more than one of the multiple network interfaces, and wherein the determining further comprises selecting from among the more than one network interfaces according to a heuristic.

3. The computer-performed method of claim 2, wherein the selecting further comprises:
   determining that one of multiple network paths to the RPC application from the prospective RPC client over the more than one network interfaces is protected by a firewall; and
   selecting a given one of the multiple network paths that is not protected by a corresponding firewall.

4. The computer-performed method of claim 2, wherein the selecting further comprises:
   determining a cost for each of multiple network paths to the RPC application to the prospective RPC client over the more than one network interfaces; and
   selecting a given one of the multiple network paths that has the lowest cost.

5. The computer-performed method of claim 2, wherein the selecting further comprises:
   determining that a given one of the RPC clients is accessible over a preferred one of the network interfaces; and
   selecting a network path from the prospective client to the RPC application through the preferred one of the network interfaces.

6. The computer-performed method of claim 1, further comprising:
   detecting, by a module in a network stack of the computer system, that an RPC get address request has been received by a particular one of the multiple network interfaces;
   storing an address of a requester that sent the RPC get address request along with an identification of the particular network interface;
   responsive to the detecting and the storing, and for multiple RPC get address requests, building, by the module. a table of network addresses that correspond to identifiers for the multiple network interfaces;
   responsive to the receiving, sending an interface identify request from an RPC binding daemon that handles the receiving of the RPC get address request to the module to specify which of the multiple network interfaces received the RPC get address request, wherein the address of the requester is provided to the module in conjunction with the interface identify request;
   retrieving the stored identification of the particular network interface using the address of the requester; and
   returning the identification of the particular network interface in response to the interface identify request.

7. The computer-performed method of claim 6, wherein the storing further stores a time that the corresponding RPC get address request was received, and further comprising retiring the entries when the elapsed time since the time the corresponding RPC get address request was received has exceeded a threshold.

8. A computer system comprising a processor for executing program instructions and a memory coupled to the processor for executing the program instructions, wherein the computer is coupled to a network through multiple network interfaces, wherein the program instructions include program instructions for connecting to remote procedure call (RPC) programs in the computer system, and wherein the program instructions comprise:
   program instructions for receiving a request for a network address to an RPC program from a prospective RPC client, wherein the request includes a response address of the prospective RPC client;
   program instructions for identifying, from the response address, an identity of a particular one of the multiple network interfaces through which the prospective RPC client sent the request;
   program instructions for, in conformity with the identity of the particular network interface, determining an address of an RPC application that is accessible to the RPC client over the particular network interface and that provides the RPC program specified in the request; and
   program instructions for returning the address of the RPC application to the prospective RPC client in response to the received request.

9. The computer system of claim 8, wherein the prospective client is accessible to the RPC application that provides the RPC program specified in the request over more than one of the multiple network interfaces, and wherein the program instructions for determining further comprise program instructions for selecting from among the more than one network interfaces according to a heuristic.

10. The computer system of claim 9, wherein the program instructions for selecting further comprise:

program instructions for determining that one of multiple network paths to the RPC application from the prospective RPC client over the more than one network interfaces is protected by a firewall; and program instructions for selecting a given one of the multiple network paths that is not protected by a corresponding firewall.

11. The computer system of claim 9, wherein the program instructions for selecting further comprise:

program instructions for determining a cost for each of multiple network paths to the RPC application to the prospective RPC client over the more than one network interfaces; and program instructions for selecting a given one of the multiple network paths that has the lowest cost.

12. The computer system of claim 9, wherein the program instructions for selecting further comprise:

program instructions for determining that a given one of the RPC clients is accessible over a preferred one of the network interfaces; and program instructions for selecting a network path from the prospective client to the RPC application through the preferred one of the network interfaces.

13. The computer system of claim 8, wherein the program instructions further comprise:

program instructions for detecting, by a module in a network stack of the computer system, that an RPC get address request has been received by a particular one of the multiple network interfaces;

program instructions for storing an address of a requester that sent the RPC get address request along with an identification of the particular network interface;

program instructions for responsive to the detecting and the storing, and for multiple RPC get address requests, building, by the module. a table of network addresses that correspond to identifiers for the multiple network interfaces;

program instructions for responsive to the receiving, sending an interface identify request from an RPC binding daemon that handles the receiving of the RPC get address request to the module to specify which of the multiple network interfaces received the RPC get address request, wherein the address of the requester is provided to the module in conjunction with the interface identify request;

program instructions for retrieving the stored identification of the particular network interface using the address of the requester; and program instructions for returning the identification of the particular network interface in response to the interface identify request.

14. The computer system of claim 13, wherein the program instructions for storing further store a time that the corresponding RPC get address request was received, and further comprising program instructions for retiring the entries when the elapsed time since the time the corresponding RPC get address request was received has exceeded a threshold.

15. A computer program product comprising a computer-readable memory device storing program instructions for execution within a computer system coupled to a network through multiple network interfaces, wherein the program instructions include program instructions for connecting to remote procedure call (RPC) programs in the computer system, wherein the program instructions comprise program instructions for:

receiving a request for a network address to an RPC program from a prospective RPC client, wherein the request includes a response address of the prospective RPC client;

identifying, from the response address, an identity of a particular one of the multiple network interfaces through which the prospective RPC client sent the request;

in conformity with the identity of the particular network interface, determining an address of an RPC application that is accessible to the RPC client over the particular network interface and that provides the RPC program specified in the request; and returning the address of the RPC application to the prospective RPC client in response to the received request.

16. The computer program product of claim 15, wherein the prospective client is accessible to the RPC application that provides the RPC program specified in the request over more than one of the multiple network interfaces, and wherein the program instructions for determining further comprise program instructions for selecting from among the more than one network interfaces according to a heuristic.

17. The computer program product of claim 16, wherein the program instructions for selecting further comprise program instructions for:

determining that one of multiple network paths to the RPC application from the prospective RPC client over the more than one network interfaces is protected by a firewall; and selecting a given one of the multiple network paths that is not protected by a corresponding firewall.

18. The computer program product of claim 16, wherein the program instructions for selecting further comprise program instructions for:

determining a cost for each of multiple network paths to the RPC application to the prospective RPC client over the more than one network interfaces; and selecting a given one of the multiple network paths that has the lowest cost.

19. The computer program product of claim 16, wherein the program instructions for selecting further comprise program instructions for:

determining that a given one of the RPC clients is accessible over a preferred one of the network interfaces; and selecting a network path from the prospective client to the RPC application through the preferred one of the network interfaces.

20. The computer program product of claim 15, wherein the program instructions further comprise program instructions for:

detecting, by a module in a network stack of the computer system, that an RPC get address request has been received by a particular one of the multiple network interfaces;

storing an address of a requester that sent the RPC get address request along with an identification of the particular network interface;

responsive to the detecting and the storing, and for multiple RPC get address requests, building, by the module. a table of network addresses that correspond to identifiers for the multiple network interfaces;

responsive to the receiving, sending an interface identify request from an RPC binding daemon that handles the receiving of the RPC get address request to the module to specify which of the multiple network interfaces received the RPC get address request, wherein the address of the requester is provided to the module in conjunction with the interface identify request;

retrieving the stored identification of the particular network interface using the address of the requester; and returning the identification of the particular network interface in response to the interface identify request.

21. The computer program product of claim 20, wherein the program instructions for storing further store a time that the corresponding RPC get address request was received, and further comprising program instructions for retiring the entries when the elapsed time since the time the corresponding RPC get address request was received has exceeded a threshold.

* * * * *